March 30, 1943.  F. E. WOLCOTT  2,315,473
MEASURING DISPENSER
Filed March 30, 1940
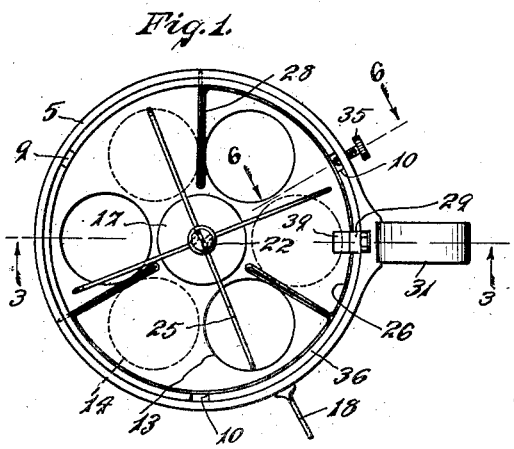
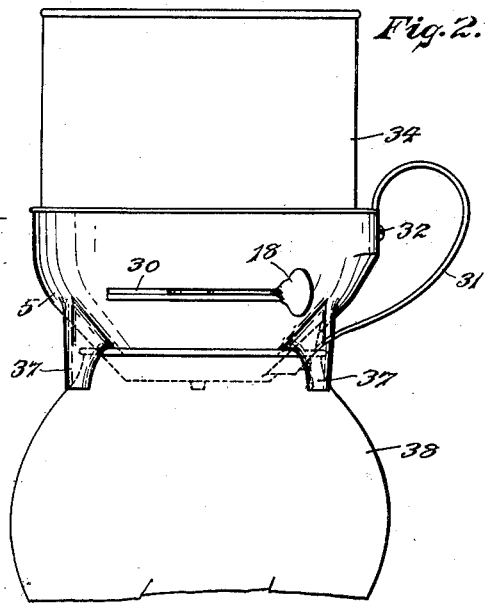
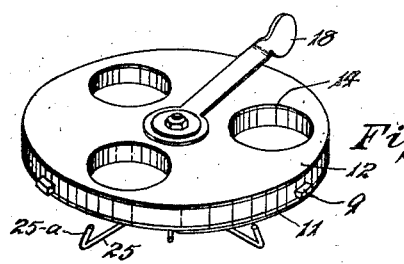
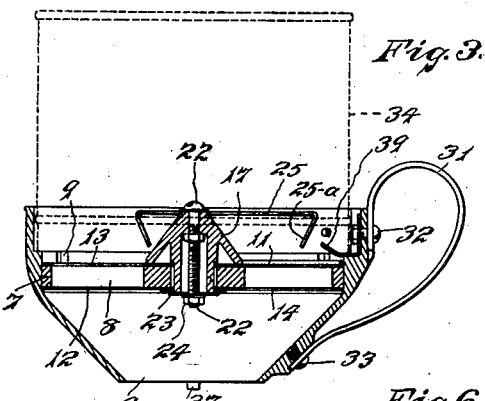
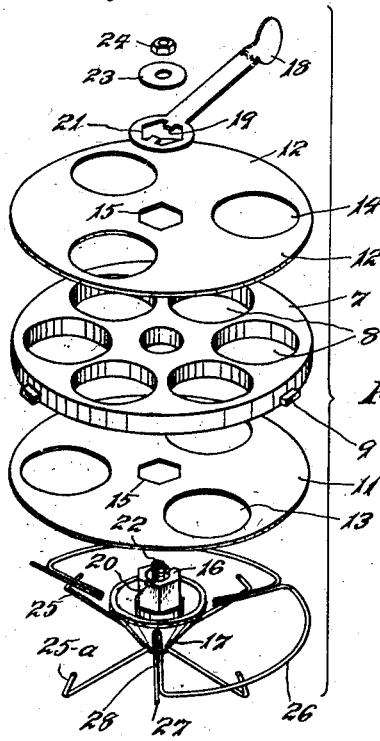
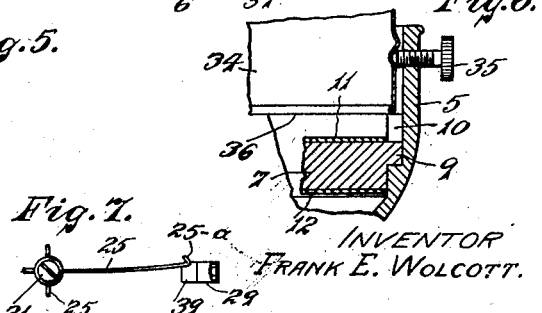
INVENTOR
FRANK E. WOLCOTT.
BY Louis V. Lucia
ATTORNEY Patented Mar. 30, 1943

2,315,473

UNITED STATES PATENT OFFICE 2,315,473

MEASURING DISPENSER

Frank E. Wolcott, West Hartford, Conn., assignor to The Silex Company, Hartford, Conn., a corporation of Connecticut Application March 30, 1940, Serial No. 327,012

5 Claims. (Cl. 221—116)

This invention relates to measuring dispensers and particularly to such dispensers as are adapted for use in measuring and dispensing materials such as coffee.

It is an object of the present invention to provide a measuring dispenser which is portable and particularly adapted for use in connection with coffee makers and the like, and whereby coffee may be measured and dispensed directly into the said coffee makers.

A further object of the present invention is to provide a dispenser which may be readily attached to a material container, of conventional form, to dispense the material therefrom as desired.

A still further object, is to provide, for such a dispenser, means for firmly fastening the container to the dispenser and means for jarring, or applying a vibrating effect, upon the dispenser and container, to loosen the coffee or other material in the container and cause it to gravitate into the dispenser.

Other objects and advantages of the invention will be clearly understood from the following description and from the accompanying drawing in which:

Fig. 1 is an elevational plan view of a dispenser embodying my invention.

Fig. 2 is a side view, in elevation, of said dispenser illustrating the use thereof in connection with a coffee maker.

Fig. 3 is a side view, in central vertical section.

Fig. 4 is a perspective view of the measuring unit, as removed from the body of the dispenser.

Fig. 5 is an exploded perspective view showing the different parts of said unit in their relative positions.

Fig. 6 is a fragmentary view, on an enlarged scale, illustrating the means for securing the material container within the dispenser.

Fig. 7 is a fragmentary view illustrating the operation of the jarring means of my improved dispenser.

As illustrated in the drawing, my improved dispenser comprises a body 5, having a funnel shaped lower portion with an opening 6 therein for the passage of the material which is to be dispensed.

Contained in said body is a measuring unit which consists of a disc shaped member 7 having measuring openings 8 therein and a series of projecting lugs 9, which are received in notches 10 in the interior wall of said body, to support the said member 7 in operative position.

An inlet plate 11 in the form of a disc is mounted in contact with the upper surface of the measuring disc 7, and an outlet plate 12, in the form of a disc and similar to the plate 11, is positioned against the under surface of the said measuring disc.

The inlet and outlet plates 11 and 12 are respectively provided with inlet and outlet openings 13 and 14. The said plates are a duplicate of each other and have a hexagonal aperture 15, in the center thereof, to receive the stud 16 projecting downwardly from a central material directing member 17, which is preferably in the shape of a cone.

It will be noted that the said plates 11 and 12 are relatively positioned, by means of the stud 16 and the apertures 15, so that the openings in each plate are relatively disposed with their vertical axis in between those of the opposite plate and so that, when the openings in one of the plates register with three alternate measuring openings in the measuring disc 7, the openings in the other plate will register with the in-between openings in said measuring plate. Therefore, when a group of measuring recesses 8 are opened at the top, by means of the openings 13, they are closed at the bottom, by the disc 12, and the in-between measuring openings are closed at the top and opened at the bottom by the openings 14.

An operating lever 18 is connected to the stud 16, by means of tongues 19 fitting in notches 20 in the end of the stud and also by a peripheral arrangement between the hexagonal opening 21 in said operating handle and the outside of the stud, and all of the parts of the measuring unit are held in assembling relation, as illustrated in Fig. 4 by means of the screw 22 which extends through a retaining washer 23 and a nut 24.

Agitating members, in the form of right angles providing spring bars 25, are secured in grooves at the top of the directing member 17, also by means of a washer under the head of the screw 22.

The measuring unit, as illustrated in Fig. 4, may be mounted within the body member 5 of my improved dispenser in a position inverted from that illustrated in said figure, as a complete assembly, and is supported in said body member by means of the projections 9 which fit within notches 10 and rest upon shoulders at the bottom of said notches.

In order to retain the said measuring unit in said body member, I provide retaining means in the form of a wire frame 26 having projections 27 extending into apertures in the inner wall of the body 5. The said wire member may also include extensions 28 which reach inwardly over the inlet plate 11 so as to push the material off the surface of said plate and into the measuring recesses 8. A clip 29 is provided at one side of the inner wall of the said body, and overlies the wire frame 26 to retain the central portion thereof in position against the inlet plate.

When the said measuring unit is assembled in the body member 5, the operating handle 18 extends through a slot 30, in the wall of said body member, as clearly illustrated in Fig. 2.

In order to support said dispenser while in use, a handle 31 is provided at one side thereof and secured to the body 5 by means of a screw 32 which projects through the wall of said body and retains the clip 29 within a notch in the inner wall of said body. The bottom portion of the handle 31 is also secured to the body by means of a screw 33.

In order to retain the material container, such as the coffee can illustrated at 34, attached to the dispenser, I provide an adjustable retaining screw 35 which is threaded to and projects through the wall of said body member so as to engage the outer wall of the container, as illustrated in Fig. 6, and thereby frictionally, or by engagement with some particular formation on the outer surface of the said container, secure the same in inverted position upon the annular shoulder 36.

If desired, the material container may be retained in the dispenser by means of the screw 32 which may project into the container receiving portion of the body member 5, as clearly illustrated in Fig. 3 of the drawing, so that the end of the said screw will engage the container and cause a binding action thereon which will serve to retain the container in position.

In the operation of my invention for measuring and dispensing such as coffee, my improved dispenser is first placed, in inverted position, over the open coffee can. The retaining screw 35 may then be tightened against the wall of the container in order to firmly retain it therein. The said dispenser is then returned to its upright position and the container will be disposed in inverted position, as clearly illustrated in Figures 2 and 3. Coffee may then be measured and dispensed, through the opening in the funnel shaped bottom of the body member, by simply moving the operating lever 18 from one end of the slot 30 to the other. This reciprocating motion of the operating lever will uncover three of the six measuring recesses in the measuring disc 7, to permit coffee to enter therein while, at the same time, it will open the bottoms of the three in-between measuring recesses to permit the coffee therein to pass out into the bottom of the funnel shaped body member while also closing the tops of these latter three recesses to prevent more coffee from passing through while they are open at the bottom.

It will be noted that I have provided feet 37, of which there are preferably three, extending downwardly from the bottom of the body member to a distance slightly below the opening in the said bottom, so that the said feet may support the dispenser upon a surface, such as the top of a table, without the bottom of the dispenser coming in contact with said surface and thereby preventing dirt from being picked up and mixed with the material that is dispensed.

The said feet are also spaced and have inner surfaces substantially conforming with the top of a coffee maker, and preferably of such coffee makers known as the vacuum type and comprising an upper bowl which is indicated at 38.

It will be clearly understood that my dispenser is particularly convenient in the use thereof by reason of the provision of the handle 31 and of the said foot members 37, because it may be conveniently held, in relative position with the coffee maker, by grasping the handle 31 with one hand and operating the handle 18 with the other and thereby delivering the coffee, or other material, directly into the desired position.

In the dispensing of coffee or other similar finely ground materials it has been found that, in order to insure the proper measurements thereof at each operation of a dispenser, it is necessary to agitate the material so that it will flow freely into the measuring recesses and uniformly fill said recesses in the short interval of time that they are open from the top during the reciprocation of the operating handle.

It will be noted that the agitators 25 have their ends bent downwardly, as at 25—a, to assure agitation of the material resting on the inlet plate 11. However, while the agitators 25 function to loosen up the material to a considerable degree, they are sometimes found to be inadequate when the material is in such a badly caked condition that the agitators cannot reach it. Therefore, in order to insure proper gravitation of the material in the container above the position of the agitators 25, I provide means for jarring, or vibrating, the entire assembly upon each operation of the handle 18 in either direction. The said means preferably consists of a projection 39, on the retaining clip 29, which is disposed in position to intercept the downwardly extending end 25—a of one of the agitator bars 25. The said bar, being resilient to a certain degree, will engage the projection 39, each time that the handle is operated, and be flexed, as clearly illustrated in Fig. 7, until it snaps past the said extension and thereby produces a vibration, or snap, which serves to loosen the material in the container 34 and thereby cause said material to gravitate downwardly within reach of the agitators 25 in the dispenser.

It is to be understood that while I have illustrated a specific embodiment of my invention, the said vibrating means herein described, as well as other elements of the structure illustrated, may be modified to a greater or lesser degree without departing from the scope of the invention as set forth in the appended claims.

I claim:

1. A dispenser of the character described comprising a mechanism including a stationary measuring disc having a series of apertures providing measuring recesses therein, movable inlet and outlet discs disposed at opposite sides of said measuring disc, an axial member projecting above said inlet disc, and agitating means carried by said axial member; said agitating means including V-shaped wire members fitting within notches in the top of said axial member and retained in said notches by means of a fastening member extending through said axial member.

2. A measuring dispenser of the character described comprising a body member having a dispenser mechanism supported therein, means for supporting a container in inverted position over said dispensing mechanism, a handle on said body member, and means for securing said handle to said body member; said securing means extending through the wall of said body member for engaging said container to retain the same in said dispenser.

3. A measuring dispenser of the character described comprising a funnel shaped body member having slots in the inner surface of the wall thereof, dispensing mechanism including a disc having extensions thereon fitting within said slots and resting upon the bottoms thereof for supporting said disc and preventing rotation thereof in said body member, and means on said disc for controlling the passage of material therethrough.

4. A dispenser of the character described comprising a body member having a dispensing mechanism mounted therein; said mechanism including a stationary measuring disc having a series of apertures for providing measuring recesses therein, movable inlet and outlet discs disposed at the opposite sides of said measuring disc, means for rotating said movable discs relative to said measuring disc, and means for retaining said mechanism in said body member; said retaining means including a resilient wire member fitting close to the inner wall of said body member and having inwardly projecting extensions on said member adjacent to said inlet disc for preventing material resting on said inlet disc from moving therewith and thereby guiding said material into said measuring recesses, and means for securing said retaining member to said body member including projections on the retaining member fitting into apertures in the wall of the body member and a retaining bracket secured to said body member and extending over said retaining member intermediate said extensions.

5. A dispenser of the character described comprising a funnel shaped body member having a handle thereon for supporting the same in position to dispense material therefrom directly into a container or member intended to receive said material, a dispensing mechanism positioned in said member including a measuring disc having a series of apertures for providing measuring recesses therein, peripheral extensions on said disc adapted to fit within notches in the inner wall of the funnel shaped member and rest upon the bottoms of said notches to support said measuring disc, similar inlet and outlet discs disposed at opposite sides of said measuring disc, a polygonal axial member extending through said discs and fitting into co-operating apertures to position said inlet and outlet discs relatively to said measuring recesses, a handle connected to said polygonal member for rotating the said inlet and outlet discs, a material directing portion on said axial member, agitating members mounted on said portion and rotatable therewith, and means engaging at least one of said agitating members for applying an impulse to said dispenser and thereby causing the gravitation of said material.

FRANK E. WOLCOTT.